United States Patent
Liu et al.

(10) Patent No.: US 10,915,424 B2
(45) Date of Patent: Feb. 9, 2021

(54) DEFEATING DEADLOCKS IN PRODUCTION SOFTWARE

(71) Applicant: The Board of Regents of The University of Texas System, Austin, TX (US)

(72) Inventors: Tongping Liu, San Antonio, TX (US); Jinpeng Zhou, Pittsburgh, PA (US); Sam Silvestro, San Antonio, TX (US); Hongyu Liu, San Antonio, TX (US)

(73) Assignee: The Board of Regents of The University of Texas System, Austin, TX (US)

( * ) Notice: Subject to any disclaimer, the term of this patent is extended or adjusted under 35 U.S.C. 154(b) by 43 days.

(21) Appl. No.: 16/159,234

(22) Filed: Oct. 12, 2018

(65) Prior Publication Data

US 2019/0114248 A1 Apr. 18, 2019

Related U.S. Application Data

(60) Provisional application No. 62/571,436, filed on Oct. 12, 2017.

(51) Int. Cl.
*G06F 11/36* (2006.01)
*G06F 9/52* (2006.01)

(52) U.S. Cl.
CPC .......... *G06F 11/3612* (2013.01); *G06F 9/524* (2013.01); *G06F 11/3628* (2013.01); *G06F 11/3636* (2013.01); *G06F 11/3664* (2013.01)

(58) Field of Classification Search
None
See application file for complete search history.

(56) References Cited

U.S. PATENT DOCUMENTS

| 2003/0023656 A1* | 1/2003 | Hutchison | G06F 9/524 718/100 |
| 2009/0235002 A1* | 9/2009 | Nir-Buchbinder | G06F 9/524 710/240 |

(Continued)

OTHER PUBLICATIONS

Jula, "Deadlock Immunity: Enabling Systems to Defend Against Deadlocks", 2008, 8th USENIX Symposium on Operating Systems Design and Implementation (Year: 2008).*

(Continued)

*Primary Examiner* — Hossain M Morshed
(74) *Attorney, Agent, or Firm* — Smith, Gambrell & Russell, LLP

(57) ABSTRACT

The techniques described herein may provide deadlock detection and prevention with improved performance and reduced overhead over existing systems. For example, in an embodiment, a method for improving performance of software code by preventing deadlocks may comprise executing software code in a computer system comprising a processor, memory accessible by the processor, and program instructions and data for the software code stored in the memory, the program instructions executable by the processor to execute the software code, logging information relating to occurrence of deadlock conditions among threads in the executing software code, detecting occurrence of deadlock conditions in the software code based on the logged information, and modifying the software code or data used by the software code so as to prevent occurrence of at least one detected deadlock condition.

12 Claims, 15 Drawing Sheets

(56) References Cited

U.S. PATENT DOCUMENTS

| | | | |
|---|---|---|---|
| 2010/0138460 | A1 | 6/2010 | Ogasawara |
| 2010/0161573 | A1* | 6/2010 | Chan .................. G06F 16/2343 707/704 |
| 2012/0030657 | A1* | 2/2012 | Gao ........................ G06F 9/524 717/128 |
| 2012/0096317 | A1* | 4/2012 | Li ........................... G06F 9/524 714/38.1 |
| 2013/0332910 | A1* | 12/2013 | Ganai .................. G06F 11/366 717/131 |
| 2015/0242276 | A1* | 8/2015 | Cain, III ............... G06F 11/141 714/38.1 |
| 2016/0328276 | A1* | 11/2016 | Tanimoto ................ G06F 9/547 |
| 2017/0061012 | A1 | 3/2017 | Bortnikov et al. |
| 2019/0114248 | A1* | 4/2019 | Liu ..................... G06F 11/3636 |
| 2019/0129786 | A1 | 5/2019 | Liu et al. |

OTHER PUBLICATIONS

Lwn.net, "The kernel lock validator", 2006, published at https://lwn.net/Articles/185666/ (Year: 2006).*

Jula, "Deadlock Immunity: Enabling Systems to Defend Against Deadlocks", 2008, OSDI (Year: 2008).*

Lwn.net, "The kernel lock validator", 2006, https://lwn.net/Articles/185666/ (Year: 2006).*

Pure python memcached client. https://pypi.python.org/pypi/python-memcached. Dec. 15, 2017.

Ab Developers. ab—apache http server benchmarking tool. https://httpd. apache.org/docs/2.4/programs/ab.html. Feb. 2012.

Authors of Dimmunix. Dimmunix: Deadlock immunity system for Java/C/C++ software. https://code.google.com/archive/p/dimmunix, 2016.

S. Bensalem and K. Havelund. Dynamic deadlock analysis of multi-threaded programs. In Proceedings of the First Haifa International Con-ference on Hardware and Software Verification and Testing, HVC'05, pp. 208-223, Berlin, Heidelberg, 2006. Springer-Verlag.

C. Bienia and K. Li. PARSEC 2.0: A new benchmark suite for chip-multiprocessors. In Proceedings of the 5th Annual Workshop on Modeling, Benchmarking and Simulation, Jun. 2009.

Y. Cai and L. Cao. Fixing deadlocks via lock pre-acquisitions. In Proceedings of the 38th International Conference on Software Engineering, ICSE '16, pp. 1109-1120, New York, NY, USA, 2016. ACM.

Y. Cai and W. Chan. MagicFuzzer: scalable deadlock detection for large-scale applications. In Proceedings of the 34th International Conference on Software Engineering, pp. 606-616. IEEE Press, 2012.

Y. Cai, S. Wu, and W. K. Chan. ConLock: A constraint-based approach to dynamic checking on deadlocks in multithreaded programs. In Pro-ceedings of the 36th International Conference on Software Engineering, ICSE 2014, pp. 491-502, New York, NY, USA, 2014. ACM.

T. Cogumbreiro, R. Hu, F. Martins, and N. Yoshida. Dynamic deadlock verification for general barrier synchronisation. In Proceedings of the 20th ACM SIGPLAN Symposium on Principles and Practice of Parallel Programming, pp. 150-160. ACM, 2015.

D. Engler and K. Ashcraft. Racerx: Effective, static detection of race conditions and deadlocks. In Proceedings of the Nineteenth ACM Symposium on Operating Systems Principles, SOSP '03, pp. 237-252, New York, NY, USA, 2003. ACM.

M. Eslamimehr and J. Palsberg. Sherlock: scalable deadlock detection for concurrent programs. In Proceedings of the 22nd ACM SIGSOFT International Symposium on Foundations of Software Engineering, pp. 353-365. ACM, 2014.

C. Flanagan, K. R. M. Leino, M. Lillibridge, G. Nelson, J. B. Saxe, and R. Stata. Extended static checking for Java. In Proceedings of the ACM SIGPLAN 2002 Conference on Programming Language Design and Implementation, PLDI 02, pp. 234-245, New York, NY, USA, 2002. ACM.

C. S. Gordon, M. D. Ernst, and D. Grossman. Static lock capabilities for deadlock freedom. In Proceedings of the 8th ACM SIGPLAN workshop on Types in language design and implementation, pp. 67-78. ACM, 2012.

M. Grechanik, B. Hossain, U. Buy, and H. Wang. Preventing database deadlocks in applications. In Proceedings of the 2013 9th Joint Meeting on Foundations of Software Engineering, pp. 356-366. ACM, 2013.

M. Grechanik, B. M. Hossain, and U. Buy. Testing database-centric applications for causes of database deadlocks. In Software Testing, Verifi-cation and Validation (ICST), 2013 IEEE Sixth International Conference on, pp. 174-183. IEEE, 2013.

D. Gross. TLS performance overhead and cost on gnu/linux. http://david-grs.github.io/tls performance overhead cost linux, 2016.

K. Havelund. Using runtime analysis to guide model checking of Java programs. In Proceedings of the 7th International SPIN Workshop on SPIN Model Checking and Software Verification, pp. 245-264, London, UK, UK, 2000. Springer-Verlag.

D. Hovemeyer and W. Pugh. Finding concurrency bugs in Java. In in Proceedings of the PODC Workshop on Concurrency and Synchroniza-tion in Java Programs, 2004.

G. Jin, L. Song, W. Zhang, S. Lu, and B. Liblit. Automated atomicity-violation fixing. In Proceedings of the 32nd ACM SIGPLAN Conference on Programming Language Design and Implementation, PLDI '11, pp. 389-400, New York, NY, USA, 2011. ACM.

G. Jin, W. Zhang, D. Deng, B. Liblit, and S. Lu. Automated concurrency-bug fixing. In OSDI, vol. 12, pp. 221-236, 2012.

P. Joshi, M. Naik, K. Sen, and D. Gay. An effective dynamic analysis for detecting generalized deadlocks. In Proceedings of the eighteenth ACM SIGSOFT international symposium on Foundations of software engineering, pp. 327-336. ACM, 2010.

P. Joshi, C.-S. Park, K. Sen, and M. Naik. A randomized dynamic program analysis technique for detecting real deadlocks. ACM Sigplan Notices, 44(6):110-120, 2009.

H. Jula, D. Tralamazza, C. Zamfir, and G. Candea. Deadlock immunity: Enabling systems to defend against deadlocks. In Proceedings of the 8th USENIX conference on Operating systems design and implementation, pp. 295-308. USENIX Association, 2008.

T. Li, C. S. Ellis, A. R. Lebeck, and D. J. Sorin. Pulse: A dynamic deadlock detection mechanism using speculative execution. In Proceed-ings of the Annual Conference on USENIX Annual Technical Conference, ATEC '05, pp. 3-3, Berkeley, CA, USA, 2005. USENIX Association.

Y. Lin and S. S. Kulkarni. Automatic repair for multi-threaded programs with deadlock/livelock using maximum satisfiability. In Proceedings of the 2014 International Symposium on Software Testing and Analysis, ISSTA 2014, pp. 237-247, New York, NY, USA, 2014. ACM.

Linux Comunity. time—time a simple command or give resource usage, 2015.

P. Liu, O. Tripp, and C. Zhang. Grail: Context-aware fixing of concur-rency bugs. In Proceedings of the 22nd ACM SIGSOFT International Symposium on Foundations of Software Engineering, FSE 2014, pp. 318-329, New York, NY, USA, 2014. ACM.

P. Liu and C. Zhang. Axis: Automatically fixing atomicity violations through solving control constraints. In Proceedings of the 34th Interna-tional Conference on Software Engineering, ICSE '12, pp. 299-309, Piscataway, NJ, USA, 2012. IEEE Press.

S. Lu, S. Park, E. Seo, and Y. Zhou. Learning from mistakes: A comprehensive study on real world concurrency bug characteristics. In Proceedings of the 13th International Conference on Architectural Support for Programming Languages and Operating Systems, ASPLOS XIII, pp. 329-339, New York, NY, USA, 2008. ACM.

Z. D. Luo, R. Das, and Y. Qi. Multicore SDK: A practical and efficient deadlock detector for real-world applications. In 2011 Fourth IEEE International Conference on Software Testing, Verification and Validation, pp. 309-318, Mar. 2011.

Y. Nir-Buchbinder, R. Tzoref, and S. Ur. Deadlocks: From exhibiting to healing. In M. Leucker, editor, Runtime Verification, pp. 104-118. Springer-Verlag, Berlin, Heidelberg, 2008.

M. Pradel and T. R. Gross. Fully automatic and precise detection of thread safety violations. In Proceedings of the 33rd ACM SIGPLAN

(56) References Cited

OTHER PUBLICATIONS

Conference on Programming Language Design and Implementation, PLDI '12, pp. 521-530, New York, NY, USA, 2012. ACM.
H. K. Pyla and S. Varadarajan. Avoiding deadlock avoidance. In Proceedings of the 19th international conference on Parallel architectures and compilation techniques, pp. 75-86. ACM, 2010.
M. Samak and M. K. Ramanathan. Multithreaded test synthesis for deadlock detection. In OOPSLA, 2014.
M. Samak and M. K. Ramanathan. Trace driven dynamic deadlock detection and reproduction. In Proceedings of the 19th ACM SIGPLAN Symposium on Principles and Practice of Parallel Programming, PPoPP '14, pp. 29-42, New York, NY, USA, 2014. ACM.
SQL Developers. How sqlite is tested. https://www.sqlite.org/testing.html. 2014-2019.
Y. Wang, T. Kelly, M. Kudlur, S. Lafortune, and S. A. Mahlke. Gadara: Dynamic deadlock avoidance for multithreaded programs. In OSDI, vol. 8, pp. 281-294, 2008.
A. Williams, W. Thies, and M. D. Ernst. Static deadlock detection for Java libraries. In Proceedings of the 19th European Conference on Object-Oriented Programming, ECOOP'05, pp. 602-629, Berlin, Heidelberg, 2005. Springer-Verlag.
C. Zamfir and G. Candea. Low-overhead bug fingerprinting for fast debugging. In International Conference on Runtime Verification, pp. 460-468. Springer, 2010.
T. W. Zhen Yu, Xiaohong Su and P. Ma. Mocklinter: Linting mutual exclusive deadlocks with lock allocation graphs. International Journal of Hybrid Information Technology, 09(3)355-374, 2016.

\* cited by examiner

Potential new deadlocks due to the lock merge.

|   | Thread 1: | Thread 2: |
|---|---|---|
| 1. | Lock $l_1$; | Lock $l_3$; |
| 2. | //Intermediate lock | Lock $l_2$; |
| 3. | Lock $l_3$; | |
| 4. | Lock $l_2$; | |

Fig. 3

Atomicity violation due to the lock merge

| | Thread 1: | Thread 2: |
|---|---|---|
| 1. | Lock $l_1$; | Lock $l_1$; |
| 2. | Lock $l_2$; | Unlock $l_1$; |
| 3. | Condwait (cond, $l_2$); | Lock $l_2$; |
| 4. | Unlock $l_2$; | Condsignal (cond); |
| 5. | Unlock $l_1$; | Unlock $l_2$; |

Fig. 4

Irregular lock pattern

| | |
|---|---|
| 1. | Lock $l_1$; |
| 2. | Lock $l_2$; |
| 3. | Unlock $l_2$; |
| 4. | Unlock $l_2$; // Irregular lock pattern |
| 5. | Unlock $l_1$; |

Fig. 6

- Record acquisitions as necessary
  - Nested only
  - Multiple threads only

Record nothing when there's only one thread alive

Thread 1
Lock $l_1$  ✗
Unlock $l_1$
Lock $l_1$  ✓
Lock $l_2$  ✓

Thread 1
Lock $l_1$  ✓
Lock $l_2$  ✓
Unlock $l_2$
Unlock $l_1$
Lock $l_1$  ✗
Lock $l_2$  ✗

Fig. 7

- Record call stacks as necessary
  - Fetching call stacks may be very expensive!!
    - Don't fetch if it's the first level lock;
    - Don't fetch if same stack offset and same lock variable address

```
main () {
    Lock l_1;    ✗ // 1st level lock
    Lock l_2;    ✓ // fetch call stack
    Unlock l_2;
    Unlock l_1;  ✗ // 1st level lock
    Lock l_1;    ✗ // same stack offset & same lock
    Lock l_2;
```

- Comprehensively
  - Intercept exits
    - Define a function with the destructor attribute
    - Register a signal handler for SIGTERM, SIGQUIT, ...
  - Check the whole recorded trace when execution exits

- Lock-variable-based prevention
  - Merging multiple locks into the same lock via redirection
    - Intercepting lock initialization
  - Self-improved prevention
    - Update merge-set after every execution

Fig. 13
- Lock-variable-based prevention
Fix via lock initialization
pthread_mutex_init ()
 -Key feature: Call stack
PTHREAD_MUTEX_INITIALIZER
 - Does not have a call stack?
 - Only for global locks
 - Key feature: variable address
Deadlock History File
Merge-set #1:
$l_1$: call stack of init()
$l_2$: no call stack

Fig. 14

- Concerns
  - Significantly increase lock contention?
    Not for deployed software
    - Deployed software often well tested
    - Deadlocks related to frequently-acquired locks are rare

Fig. 15

- Concerns
  - Create new deadlocks or violate atomicity?
    Possibly!

| Thread 1 | Thread 2 |
|----------|----------|
| Lock $l_1$ | Lock $l_3$ |
| Lock $l_3$ | Lock $l_2$ |
| Lock $l_2$ | |

Fig. 16

- Concerns
  - Create new deadlocks or violate atomicity?
    Possibly!
    Solution:
    - Merge intermediate locks as well
    - Don't merge when related to conditional waits

| Thread 1 | Thread 2 |
|---|---|
| Lock $l_{12}$ | Lock $l_3$ |
| Lock $l_3$ | Lock $l_{12}$ |
| Lock $l_{12}$ | |

Thread 1
Lock $l_1$
// protected by $l_1$
Lock $l_2$
Condwait ( cond, $l_2$ )

DEFEATING DEADLOCKS IN PRODUCTION SOFTWARE

CROSS-REFERENCE TO RELATED APPLICATIONS

This application claims the benefit of U.S. Provisional Application No. 62/571,436, filed Oct. 12, 2017, the contents of which are incorporated herein in their entirety.

STATEMENT REGARDING FEDERALLY SPONSORED RESEARCH

This invention was made with government support under Grant No. 1566154, awarded by the National Science Foundation. The government has certain rights in the invention.

FIELD OF TECHNOLOGY

The present invention relates to the technical field of detection and prevention of deadlock conditions in software.

BACKGROUND OF THE INVENTION

Deadlocks are critical problems afflicting parallel applications, causing software to hang with no further progress. Existing detection tools suffer not only from significant recording performance overhead, but also from excessive memory and/or storage overhead. In addition, they may produce numerous false alarms. Subsequently, after problems have been reported, tremendous manual effort is required to confirm and fix these deadlocks.

The lock is possibly the most widely used synchronization primitive in multithreaded programs. It ensures that, at any time, at most one thread is allowed to execute inside a critical order to avoid unnecessary conflicts, which may easily cause a notorious concurrency problem—deadlock.

Deadlock occurs when a set of competing threads are simultaneously waiting for a lock held by their competitors, as shown, for example, in FIG. 1. In this example, thread T1 has acquired lock L1 and waits for lock L2. However, thread T2 has acquired lock L2 and waits for lock L1. This situation prevents the program from making any further progress. Since deadlocks (as well as other concurrency bugs) only occur under specific inputs and with a precise timing requirement (e.g., two threads should acquire their first locks simultaneously), they cannot be completely expunged during development phases due to incomplete tests. They may be unavoidably leaked into deployed software, which may result in unpredictable losses, as programs must be restarted when deadlocks occur. Deadlocks continue to be a serious concern, accounting for more than 30% of reported concurrency bugs.

A significant amount of work focuses on detecting deadlocks using static and dynamic approaches. Static detection tools may report numerous false positives, and are difficult to scale to large programs. Dynamic techniques primarily focus on detecting potential cycles within the execution trace. Existing dynamic approaches have the following problems. First, existing systems record the full execution context, including call stacks and the order of all lock acquisitions and releases, which imposes significant overhead in the recording phase. For instance, the performance overhead of some existing systems is between 3× and 12×. Second, the execution trace can be extremely large for long-running applications (e.g., server applications), thus leading to unaffordable memory and/or storage overhead. Third, detecting potential cycles within a large execution trace may require a considerable amount of time, for example, as long as two days. Together, these shortcomings prevent existing detection techniques from gaining widespread adoption within deployed systems.

Some approaches aim to fix known deadlocks by relying on the precise information of deadlocks that is difficult or impossible to obtain currently (due to the problems discussed above), and they may require additional manual effort (e.g., recompilation) before users can actually prevent problems. Also, many existing techniques may additionally generate new deadlocks through the introduction of gate locks.

Some existing systems provide the combination of detection and prevention in a single system, without involving additional manual effort. For example, such systems may employ a monitor thread to periodically check (100 ms by default) whether recent locks generate a cycle of lock acquisitions. If so, the system stops a susceptible program immediately and outputs the signature of locks into a persistent file used to guide its prevention during future executions. To prevent deadlocks, the system obtains the call stacks (by invoking the very slow backtrace API) upon every lock acquisition, and confirms whether this lock matches one of the known deadlock patterns. If so, the current thread will be forced to wait. For every lock release, the system checks whether a potential deadlock has been broken. If so, it may wake other threads waiting for the release event of this lock. This system allows a deadlock-prone system to function correctly while developers are fixing these discovered bugs, which is a very interesting and helpful idea that could be potentially suitable for the deployment environment. However, the system suffers from a large number of false positives, incurs large runtime overhead (as high as 726× slower, based on our evaluation), and could possibly miss some deadlocks as it only check recent locks. These serious limitations prevent this system from actually being deployed in production software. Other existing systems focus on deadlocks in database applications, by employing static analysis to find hold-and-wait cycles in transactions.

A need arises for deadlock detection and prevention techniques that provide improved performance and reduced overhead.

SUMMARY OF THE INVENTION

The techniques described herein may provide deadlock detection and prevention with improved performance and reduced overhead over existing systems. For example:

The techniques described herein may provide an efficient and effective detection tool, which outperforms existing state-of-the-art tools with the capability to detect potential deadlocks: the detection tool may impose only negligible performance overhead, less than 3% on average, which is a significant improvement over prior techniques. The present techniques may also avoid a significant number of false positives. Different from existing tools, the present techniques may provide an execution trace that is bounded by the number of unique lock dependencies and threads, which only imposes, for example, 6% memory overhead in total. The present techniques may report the precise information of deadlocks that can assist programmers in bug fixes. These properties make the present techniques may suitable for detecting deadlocks in deployed software.

The present techniques may include a novel, lock-variable based approach to prevent deadlocks. For example, all locks within the same deadlock set may be replaced by the same physical lock during the initialization phase of the lock or the program. Thus, the timing property of deadlocks—such that multiple threads may acquire different locks within the same deadlock set—is broken due to the exclusive nature of using the same physical lock. Although conceptually this approach may increase lock contention, our evaluation shows that the present techniques may only impose, for example, less than 3% performance overhead for two buggy programs when they are fed with normal inputs.

In an embodiment, a method for improving performance of software code by preventing deadlocks may comprise executing software code in a computer system comprising a processor, memory accessible by the processor, and program instructions and data for the software code stored in the memory, the program instructions executable by the processor to execute the software code, logging information relating to occurrence of deadlock conditions among threads in the executing software code, detecting occurrence of deadlock conditions in the software code based on the logged information, and modifying the software code or data used by the software code so as to prevent occurrence of at least one detected deadlock condition.

In embodiments, the logging may be performed for at least one of: nested thread execution, multiple thread execution, and call stacks. The logging may not be performed for at least one of: only one thread executing, call stacks having a first level lock, and call stacks having a same stack offset and a same lock variable address. The detecting may comprise determining at least one of a lock dependency, a dependency chain, and a cyclic chain. The detecting may comprise periodically creating a monitor thread, checking a current status, and determining that a deadlock exists when at least one cycle has occurred and the status is unchanged. The modifying may comprise at least one of: merging a plurality of locks into one lock using redirection and updating the plurality of locks to be merged after execution, and intercepting lock initialization and modifying initialization of the lock.

In an embodiment, a system for improving performance of software code by preventing deadlocks may comprise a processor, memory accessible by the processor, and program instructions and data stored in the memory, the program instructions executable by the processor to perform: executing the software code in the computer system, logging information relating to occurrence of deadlock conditions among threads in the executing software code, detecting occurrence of deadlock conditions in the software code based on the logged information, and modifying the software code or data used by the software code so as to prevent occurrence of at least one detected deadlock condition.

In an embodiment, a computer program product for improving performance of software code by preventing deadlocks may comprise a non-transitory computer readable medium storing program instructions that when executed by a processor perform: executing the software code in the computer system, logging information relating to occurrence of deadlock conditions among threads in the executing software code, detecting occurrence of deadlock conditions in the software code based on the logged information, and modifying the software code or data used by the software code so as to prevent occurrence of at least one detected deadlock condition.

BRIEF DESCRIPTION OF THE DRAWINGS

So that the manner in Which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

FIG. 3 illustrates an example of atomicity violation due to a lock merge.

FIG. 4 illustrates an example of an irregular lock pattern.

FIG. 6 illustrates an example of recording acquisitions.

FIG. 7 illustrates an example of recording call stacks.

FIG. 13 illustrates an example of lock-variable-based prevention of deadlock.

FIG. 14 illustrates an example of deadlock prevention concerns.

FIG. 15 illustrates an example of deadlock prevention concerns.

FIG. 16 illustrates an example of deadlock prevention concerns.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical, and structural changes may be made to the embodiments without departing from the spirit and scope of the present teachings. The following detailed description is therefore not to be taken in a limiting sense, and the scope of the present disclosure is defined by the appended claims and their equivalents.

Figures 1, 2:
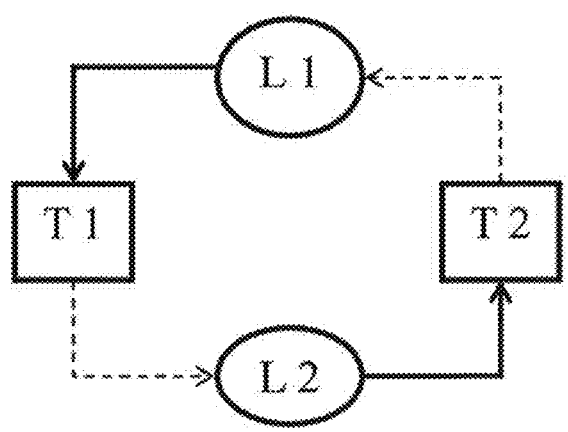
FIG. 1 illustrates an example of a simple deadlock condition.
FIG. 2 illustrates an example of potential new deadlocks due to a lock merge.

Deadlocks occur when the relationship between threads and locks generates a cycle, for example, as depicted in FIG. 1. Each thread in possession of one or more locks is further requesting an additional lock currently held by another waiting thread. Deadlocks may be easily diagnosed by experts when they actually occur. Experts could attach a debugger to the hanging process, check the call stacks of lock acquisitions made by each thread, then possibly infer the exact causes of the deadlock. However, this diagnosis process requires expert knowledge and is not suitable for normal users in the production environment. More importantly, it can only uncover actual deadlocks, while leaving behind potential deadlocks that may incur unpredictable losses in a deployed environment.

Deadlocks typically have the following key properties:

Only nested locks are capable of producing deadlocks, and single-level locks are never involved in deadlocks. In reality, the majority of lock acquisitions are not nested, but rather single-level locks.

Deadlocks are very sensitive to timing, and only occur when all participating threads can successfully acquire their first locks prior to any thread subsequently requesting an additional lock. As illustrated in FIG. 1, if one thread can first acquire both locks L1 and L2 successfully—which may cause the competing thread to fail to acquire its first lock—the deadlock will not occur.

The present techniques may detect deadlocks for use by a prevention system, as well as for normal users, while keeping low performance and memory/storage overhead. The present techniques may include several features to achieve this target. First, there is only a bounded number of unique lock dependencies, although a program may execute for a long time. When a program has n distinct locks, the maximum number of unique lock dependencies consisting of two locks will be equal to the permutation $P(n, 2)$. In reality, the actual number is even lower than this maximum number. Based on this, the present techniques may only record unique lock dependencies (under nested locks) for every thread during the execution, instead of recording the entire history of lock acquisitions and releases. The present techniques may skip all duplicated lock dependencies. Note that this will not compromise detection effectiveness, as all distinct lock dependencies (with their unique call stacks) may still be recorded completely.

This technique prevents an ever-increasing trace log for long-running applications. Instead, the size of the execution trace may become stable after seconds or minutes of execution. A small execution trace greatly reduces not only the memory/storage requirement, but also the amount of time required for the detection.

Second, the present techniques may also avoid obtaining unnecessary information during the recording phase. Single-level locks are never recorded because they will never cause potential deadlocks, as discussed above. The present techniques may discard lock acquisition events when only a single thread exists.

Third, the present techniques may minimize the overhead of collecting call stacks, which may otherwise be a major source of performance problems. The present techniques may utilize the following two methods to reduce this overhead. (1) Since most lock acquisitions are not nested (as described above), the present techniques may avoid the collection of first-level call stacks. This technique may reduce a large number of backtrace invocations, but create some inconvenience. Although the present techniques may still report which locks are involved in deadlocks, with either the initialization call stacks or the memory addresses of lock variables, users may have to manually identify where the first-level locks were acquired. However, this task should not be too difficult, given the call stacks of other lock acquisitions, and the information about the first-level locks.

(2) The present techniques may further avoid invocations of backtrace when both the stack offset of lock acquisition and the lock address are the same as existing ones. Stack offset is utilized here, since different threads may possess the same stack offset for the same call stack. It is possible (although unlikely) that two different call stacks will have the same stack offset, where users may have to identify correct call stacks manually. However, this should not affect detection and prevention.

Figure 12:
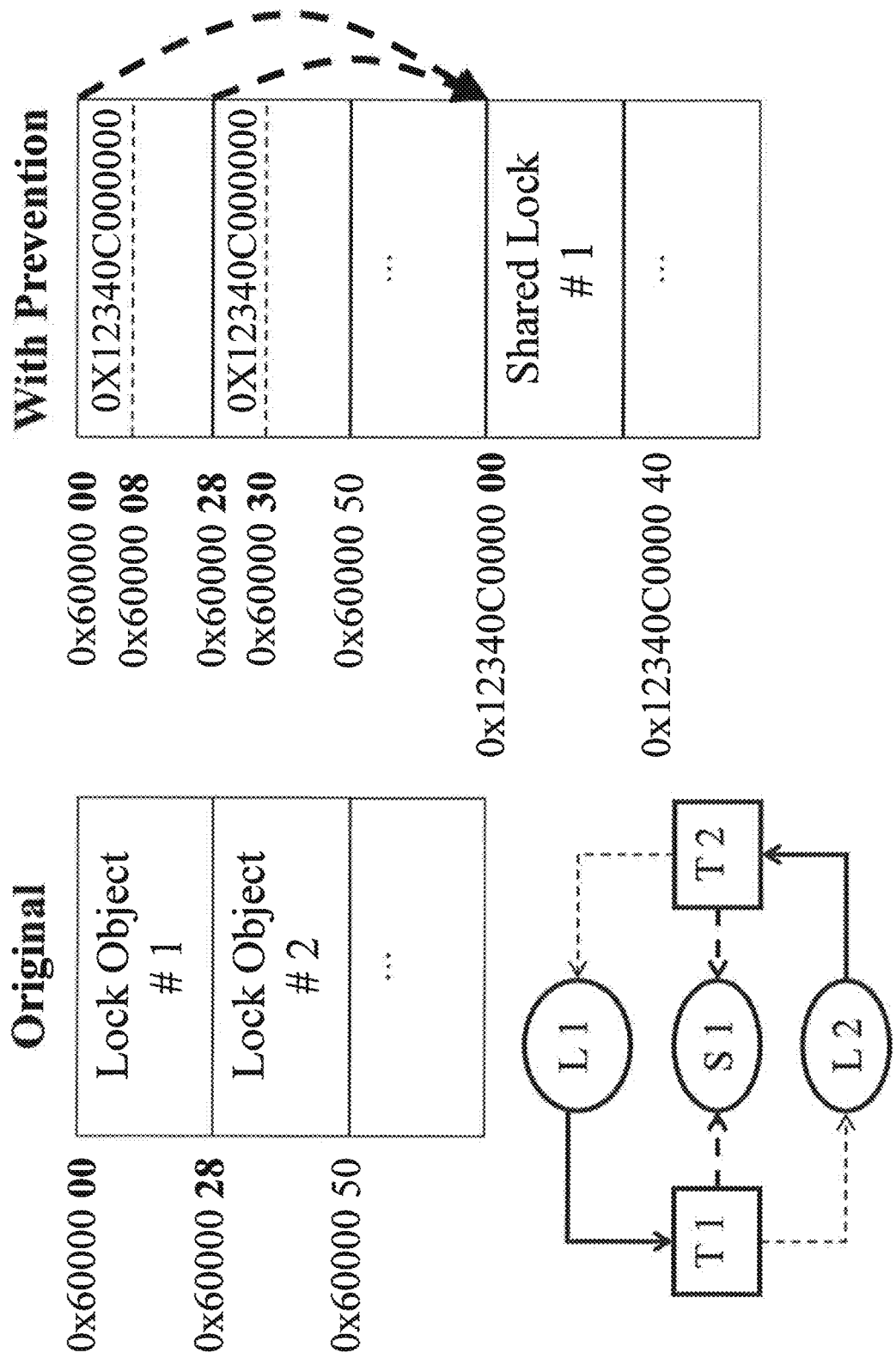
FIG. 12 illustrates an example of lock-merging based prevention of deadlock.

The present techniques may utilize a novel observation concerning the prevention of deadlocks: merging multiple locks (within the same deadlock set) into the same lock eliminates the possibility of deadlock (shown in FIG. 12). Merging multiple locks in the same deadlock set mimics the effect of using a coarse-grained lock, rather than using multiple fine-grained locks. This method eliminates the timing property of deadlocks. In the example shown in FIG. 1, when two locks (L1 and L2) are actually pointing to the same lock L12, the deadlock will never occur. If one thread acquires lock L12 successfully, it will prevent another thread from acquiring the same lock due to the exclusivity property of mutual exclusion (mutex) locks.

This method is significantly different from existing signature-based approaches. For signature-based approaches, they require the call stacks of all lock acquisitions that are involved in a deadlock, so that they can explicitly fix buggy acquisitions to avoid possible deadlocks. These approaches cannot prevent deadlocks if a single statement is neglected to be changed. Compared with these approaches, the present techniques support prevention based on an incomplete execution trace: as long as some call stacks of suspect lock variables are detected to have potential deadlocks, any call stacks consisting of these variables—even non-exercised call stacks—will be unable to cause the deadlock. The present techniques replace all of these locks with the same physical lock during the initialization phase, and prevent any possible deadlocks afterwards. Also, the present techniques require no change to the program and no re-compilation, while the prevention can be enabled automatically during future executions. The present techniques significantly reduce the prevention overhead, since there is no need to check the signature on every lock acquisition and release.

The present techniques may raise a concern with respect to the performance impact: that is, whether the merge will significantly increase lock contention. In practice, lock contention may not be substantially increased due to the following two reasons. First, deployed software has typically been extensively tested, and will not contain a large number of deadlocks. This fact will limit the number of distinct locks that should be merged. Second, every lock belonging to the deadlock sets is less likely to be acquired frequently, since deadlocks caused by frequently-acquired locks are most likely to have been eliminated during development phases. Because of these reasons, merging multiple rarely-acquired locks into the same lock may not significantly increase performance overhead. For example, the present techniques may only introduce around 3% performance overhead.

The present techniques may implicate two possible correctness issues related to lock merging, shown as FIG. 2 and FIG. 3. FIG. 2 shows an example of a potential new deadlock. In this instance, the acquisition of lock L3 is located between L1 and L2 in Thread 1, and Thread 2 will acquire L3 before acquiring L2. When L1 and L2 are merged into a new lock L12, it may create a potential deadlock caused by the lock set of {L12, L3}. FIG. 3 shows another example in which the merging of L1 and L2 may incur an atomicity violation. Thread 1 should release the merged lock L12 at the invocation point of Condwait (line 3 of Thread 1), and can possibly violate the original atomicity semantics since other threads may be able to acquire the lock L1 in the middle.

However, invoking a conditional wait while holding two locks is actually a well-known deadlock pattern. Shown as FIG. 3, Thread 2 may never acquire L1 successfully, and would subsequently be unable to wake up Thread 1.

The present techniques provide solutions for these two correctness concerns: (1) All locks (e.g., L3 of FIG. 2) occurring in the middle of a known deadlock set (e.g., {L1, L2}), and which may potentially cause deadlocks, may be merged into the same deadlock set. Thus, the situation listed as FIG. 2 may never occur, if such a lock acquisition (e.g., L3) has been observed during executions. (2) For cases such as FIG. 3, the present techniques may only report such problems to users, but may never perform automatic prevention. Thus, it may not introduce potential atomicity violations. All conditional waits inside nested locks may be recorded to avoid this problem.

Figure 5:
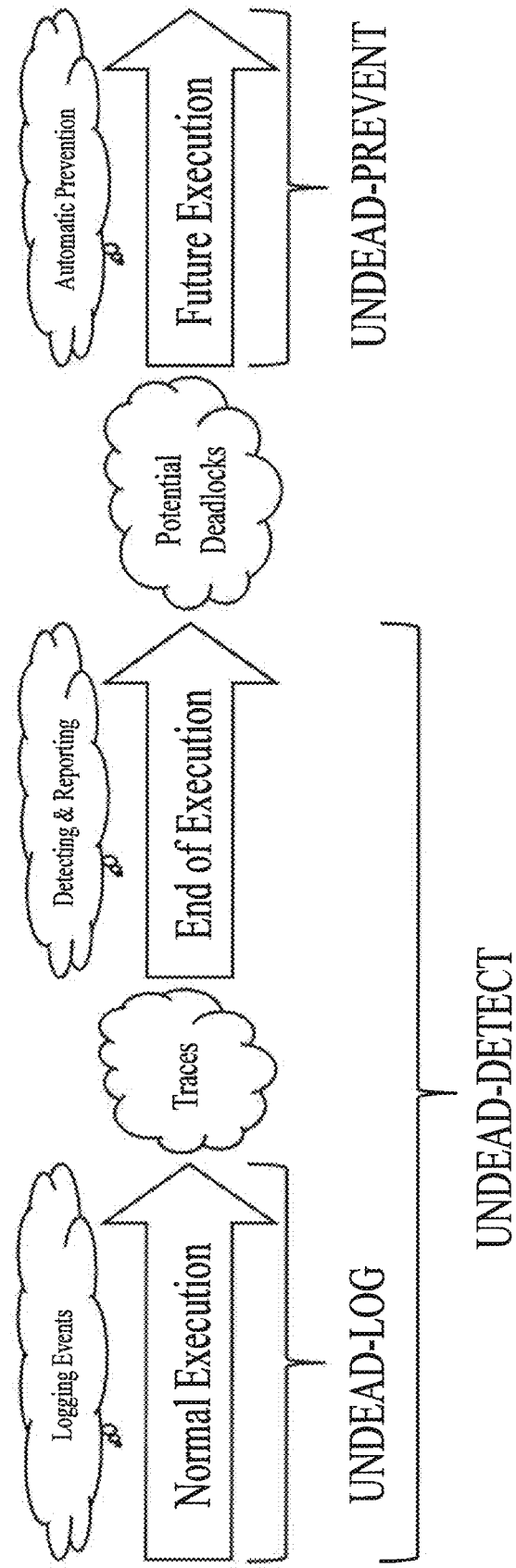
FIG. 5 illustrates an example of processes of the present techniques.

An example of the processes of the present techniques is shown in FIG. 5. These processes may include a Logging Phase, a Detection Phase, and a Prevention Phase.

For deadlock detection, the present techniques may first record necessary lock-related events during executions. Then, it may detect actual deadlocks periodically, or detect actual and potential deadlocks on program exit, or upon receiving instruction from users.

Logging Phase

The present techniques may log only necessary lock-related information, as shown in FIG. 6. The present techniques may prune unnecessary information during the logging phase, including single-level locks, unnecessary lock acquisitions during the single-threaded period, and duplicated lock dependencies. The present techniques may not only maintain low performance overhead, but also keep memory/storage consumption bounded, making it applicable to the deployed environment.

The present techniques may intercept mutex lock operations, including locks, unlocks, and try locks. For try locks, the present techniques may only record successful acquisitions. The present techniques may also intercept conditional waits, which may be treated as the combination of a lock release (prior to waiting), and a lock acquisition (after waking up). The present techniques may also record the conditional waits inside nested locks in order to avoid the problems shown in FIG. 3. Additionally, the present techniques may obtain call stacks of mutex initializations, as this information will be employed by its prevention system to accomplish deadlock prevention (Section IV).

As shown in FIG. 7, the present techniques may record call stacks as necessary. The present techniques may collect the call stacks of lock acquisitions using backtrace, but handle it differently from all existing work. The present techniques may maintain the number of locks held by each thread separately. The present techniques may not obtain the call stacks of first-level locks, but rather simply record the addresses of these locks. When a thread is acquiring more than one lock, the present techniques may first confirm whether the corresponding lock dependency already exists. If the lock dependency exists, the present techniques may further determine whether it is necessary to obtain the call stack. For example, the present techniques may confirm whether both stack offset and lock address (inside the lock dependency) of a lock acquisition are the same as existing ones, since acquiring the call stack by backtrace can be very expensive.

If both of these values and the lock dependency are the same, the present techniques may not obtain the call stack for this lock acquisition. In fact, the stack offset may be an adequate indicator of the call stack, as the chance of sharing the same stack offset but a different call stack is extremely low. Furthermore, possessing the same lock address and lock dependency further reduces the possibility of confusion. The only such situation we can envision would be with lock acquisitions within the same function, whereby the present techniques may actually identify one lock acquisition inside of each function; thus, users may be required to identify all possible lock acquisitions inside the same function manually. The prevention mechanism of the present techniques may not rely on the detection of all possible call stacks. The reason why the present techniques may use the stack offset is to extend this mechanism for multithreaded programs, where multiple threads may have the same offset but different absolute addresses. If the call stack is new, the present techniques may additionally record it. The call stacks of lock acquisitions could be utilized by existing prevention tools or used to facilitate manual fixes.

In the implementation, all lock dependencies associated with each thread may be stored in a per-thread hash table for performance reasons. This technique may introduce slightly more memory overhead used to hold unique lock dependencies, but avoids any coherence traffic caused by concurrent accesses from multiple threads. Also, it eliminates the necessity of using locks to protect the actions of searching and adding new lock dependencies. To save lock dependencies, a naive approach would involve storing all dependencies beginning with the same lock in the same bucket in a hash table. However, this naive method may introduce excessive conflicts when multiple locks depend on the same lock. Instead, the present techniques may utilize the combination of two locks as the key for the hash table. For example, if lock L1 is dependent on locks {L2, L3}, the present techniques may utilize the XOR value of the addresses of the two most internal locks (e.g., L1 and L2 here) as the search key. This technique may substantially reduce conflicts on hash keys, and thus considerably reduces the number of comparisons required to check the duplicates of a lock dependency.

The present techniques may also improve the performance of checking per-thread data. Significant overhead may be associated with retrieving per-thread data upon every intercepted function invocation, if the thread-local storage area (declared using the keyword "_thread") is utilized. When using thread-local storage, the system assigns a unique global ID to each thread-local variable, and maintains a Thread Local Storage (TLS) lookup table for all threads. Searching the thread-local area involves at least the cost of an external library call, as well as a lookup in the indexed table using the global ID. Thus, the present techniques may use a novel method to circumvent the cost of using TLS variables. Because every thread will be allotted its own stack, the address of a stack variable may be utilized to identify a particular thread. Thus, the present techniques may initially allocate a global map, which will be used to create the stack areas for every thread. Upon creation of each thread, the present techniques may assign a specific stack area to the thread based on its internal thread index. During execution, the present techniques may be able to compute the thread index by dividing the offset between a stack variable and the starting address of the global stack map with the stack size. With the computed thread index, the present techniques may easily obtain the per-thread data from a shared global array.

Periodic Detection

The present techniques may create a monitor thread to perform the detection periodically during normal execution. This mechanism allows the present techniques to timely detect deadlocks in long-running applications.

Every thread maintains its own current locking set. The monitor thread is set to awaken periodically, with a default value of, for example, 2 seconds. Upon waking up, the monitor thread collects the current locking set of each thread, and utilizes simple loop detection as shown in FIG. 1) to cheek whether there is a cycle inside or not. If a cycle is found, the monitor thread will confirm again whether the current lock-holding status of related threads has been changed. The same status indicates that the program is actually in deadlock status, and cannot proceed. Otherwise, it is a potential deadlock that may not actually occur. The present techniques allow a program with a potential deadlock to proceed as normal. Note that the present techniques do not change the original lock logic for periodic detection, which simplifies implementation and possibly benefits performance. Instead, the present techniques utilize another confirmation to avoid any possible false positives caused by using the snapshots. If a deadlock is actually detected, the present technique further performs comprehensive detection to identify any other potential deadlocks.

Complete Detection

The present techniques may perform the complete detection process when the program is about to exit, or when it receives special instructions from users. During this process, the present techniques may check all unique lock dependencies that are traced during the execution. As discussed above, the present techniques may only keep unique lock dependencies, and may prune unnecessary information. This may reduce the detection time of the present techniques by reducing the number of items to be processed.

Intercepting exits and user instructions: The present techniques may only invoke the detection routine when it receives an instruction to do so from the user, or upon reaching the termination points of the program.

A program may terminate in various ways. Aside from exiting normally, a program may exit by explicitly calling abort, or due to failed assertions or other program errors such as segmentation faults. The present techniques may handle these different exit patterns. To intercept normal exits, the present techniques may place the detection procedure within a function marked with the destructor attribute. Furthermore, the present techniques may also register a signal handler for signals such as SIGHUP, SIGQUIT, SIGINT, and SIGSEGV, from which it invokes exit( ) such that the default exit handler will then be invoked. Additionally, users may send a special signal using the SIGUSR2 signal number to invoke the detection procedure on-demand.

Detection Algorithm: The present techniques may utilize a variety of deadlock detection techniques. However, a novel feature of the present techniques is the elimination of unnecessary information in the detection, which reduces runtime and memory/storage overhead.

Figure 8:
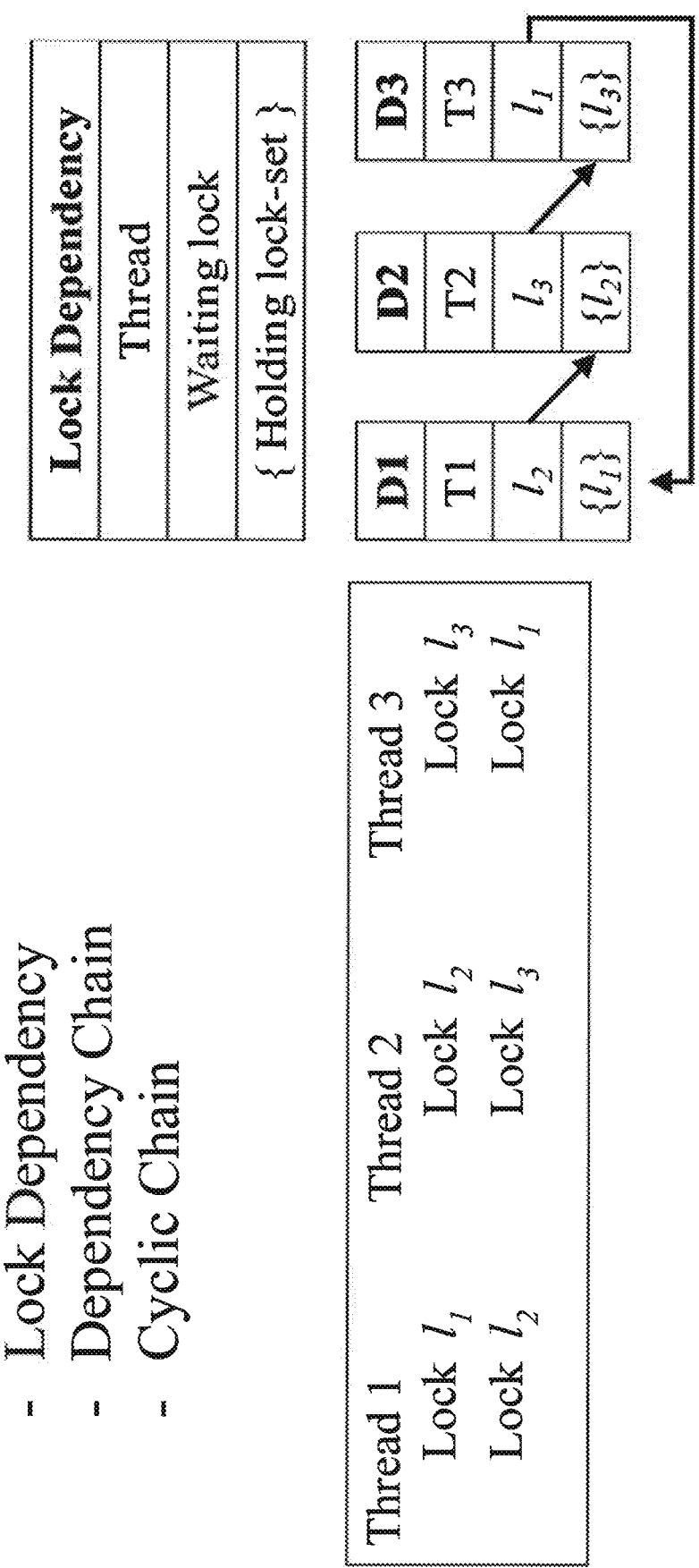
FIG. 8 illustrates an example of basic concepts that may be useful to deadlock detection.

For example, some basic concepts for deadlock detection are shown in FIG. 8:

"Lock dependency": A triple D={t, l, L} indicates that a thread t is waiting for lock l while holding all locks in set L.

"Lock dependency chain": A sequence of lock dependencies, C={$D_1, \ldots, D_k$}, describes a relationship among the lock dependencies of multiple threads: (1) each lock dependency inside C is from a distinct thread. (2) $\forall i! = j, L_i^n L_j = \emptyset$, which means no locks are held in common by any distinct pair of threads. (3) $\forall i \in [1, k-1], l_i \in L_{i+1}$, which indicates the i+1th thread has already acquired the lock li, which the i-th thread is trying to acquire.

"Cyclic lock dependency chain": A cyclic chain is a special type of lock dependency chain, where $l_k \in L_1$ in order to form a circle.

As described above, each thread records its own lock dependencies within its own per-thread hash table, which eliminates the necessity of including the thread information from the lock dependency. During detection, the present techniques may first check whether lock dependency chains exist among two threads, then three threads, and so on. If there exist lock dependency chains, the present techniques may further check for cycles within these dependency chains. A cycle in a dependency chain may indicate a potential deadlock problem, which the present techniques may report in the end.

Figure 9:
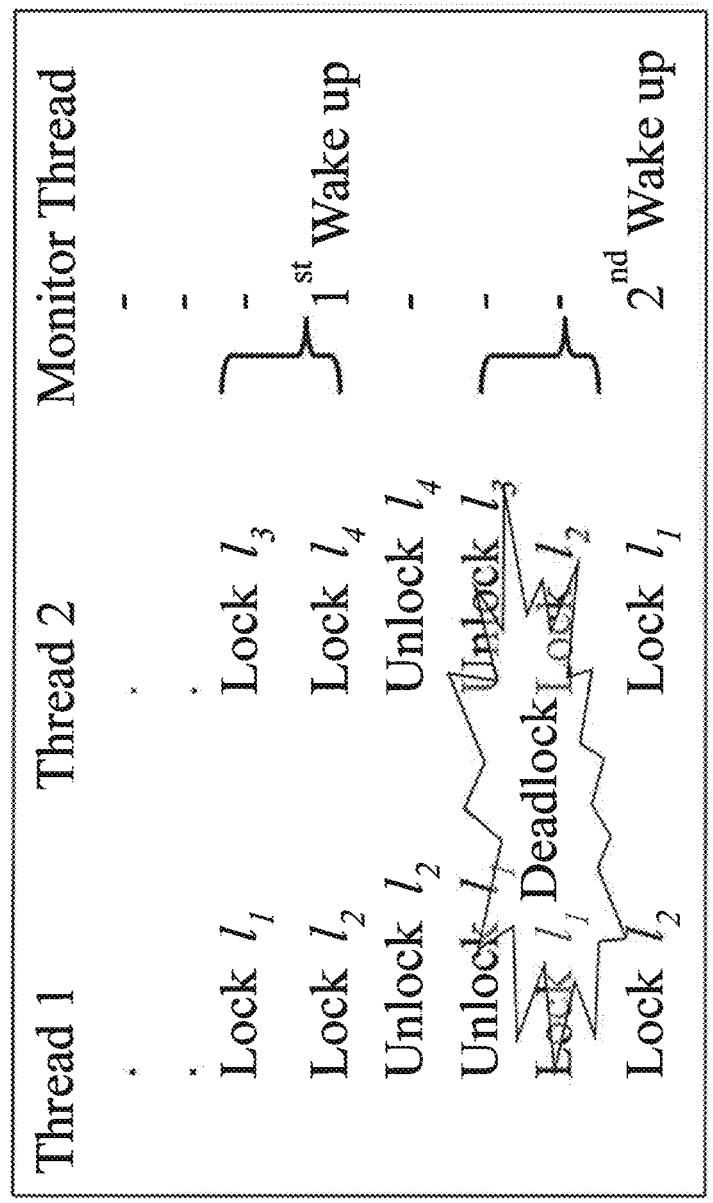
FIG. 9 illustrates an example of periodic detection of deadlock conditions.

For example, some basic concepts for deadlock detection are shown in FIG. 9. In this example, the process may periodically create a monitor thread, while only checking the current status. Thus, a Cycle plus Unchanged Status may result in detection of a Real Deadlock.

Figure 10:
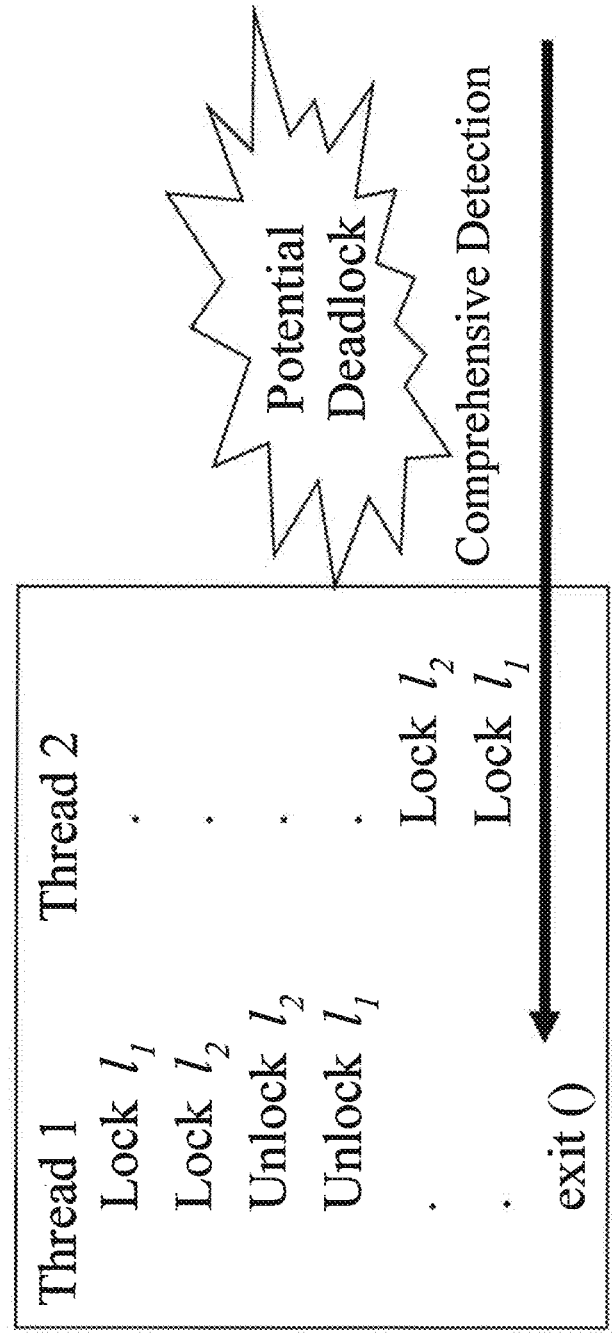
FIG. 10 illustrates an example of comprehensive detection of deadlock conditions.

For example, some basic concepts for deadlock detection are shown in FIG. 10. In this example, the process may comprehensively intercept exits, for example, by defining a function with the destructor attribute and registering a signal handler for SIGTERM, SIGQUIT, etc. Further, the process may check the whole recorded trace when execution exits.

Figure 11:
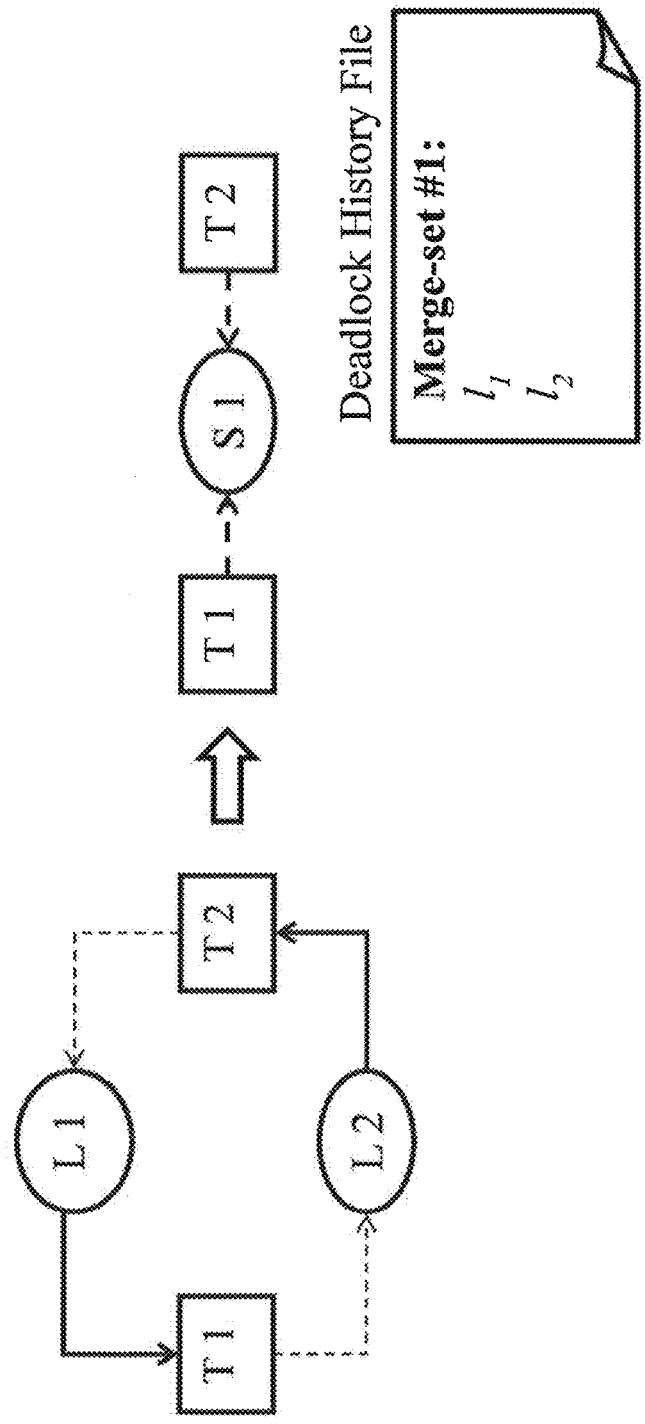
FIG. 11 illustrates an example of lock-variable-based prevention of deadlock.

For example, an example of lock-variable-based prevention of deadlock is shown in FIG. 11. In this example, the process may utilize lock-variable-based prevention, including merging multiple locks into the same lock via redirection by intercepting lock initialization and self-improved prevention, and may update the merge-set after every execution.

For example, an example of lock-merging-based prevention of deadlock is shown in FIG. 12. In this example, the difference in processing between the original processing and processing with prevention are shown.

For example, an example of lock-variable-based prevention of deadlock is shown in FIG. 13. In this example, the process may utilize lock-variable-based prevention, which may fix via lock initialization.

Reporting Deadlocks: The present techniques may generate two different reports: one for normal users or signature-based prevention systems, the other for its prevention system.

For the first report, the present techniques may report all information necessary to assist deadlock fixes, such as the call stack (with source code line information) of initialization and acquisitions of each involved lock, and the address of all involved locks. Programmers can proceed to fix these discovered deadlocks based on the reporting.

For its prevention system, the report may takes the format of a text file, in which every deadlock set is separated by a special symbol. When multiple deadlock sets exist, the present techniques may further confirm whether or not they share any common locks. If true, the present techniques may merge various lock sets containing the common lock into the same deadlock set, which may utilize the same physical lock in prevention. For the example of FIG. 2, L3 will be merged into the same deadlock set of {L1, L2}. Inside the same deadlock set, each entry on a separate line will represent a different lock, the format for which appears as such: lock address: initialization call stack. If a lock is a global variable initialized via the PTHREAD_MUTEX_INITIALIZER macro, its initialization call stack will be empty. Thus, prevention system may handle them accordingly. Depending on the preferences of the user, the present techniques may skip a deadlock set that contains a conditional wait while holding two locks.

The present techniques may experience false negatives because they cannot detect deadlocks if the corresponding code is not exercised.

In theory, the present techniques may produce false positives as well. When two lock sets have a strong happensbefore relationship which prevents their concurrent appearance, such as those ordered by conditional waits or barriers, the present techniques may incorrectly generate false alarms.

Deadlock Prevention

The prevention system may work automatically based on the detection results. The detection system may report potential deadlocks, where different lock sets are separated using a special symbol in the deadlock history file. All locks within the same deadlock set may be redirected into the same physical lock, as shown in FIG. 12, eliminating the deadlock. The present techniques may differentiate shared locks from normal ones, so that they can acquire the actual shared locks for all locks inside the same deadlock set. For example, in an embodiment, the present techniques may allocate all shared locks from an easily identifiable memory-mapped region, such as between 0x12340C000000 and 0x12340C010000, and may store the address of the shared lock in the first word of these lock objects. The first word of a pthread_mutex_t object corresponds to _lock (the lock state), and _count (the number of recursive locks), which should not fall into the special range discussed above. Thus, when the value of the first word falls within the special range, it is a pointer to a shared lock, which the present techniques may then use to force the lock acquisition onto the shared lock.

Initialization: In an embodiment, one type of lock variables may be initialized via the PTHREAD_MUTEX_INITIALIZER macro, while the other type may be initialized by explicitly invoking a mutex initialization procedure. Locks of the first type may have no call stacks inside the database file, and may be redirected before entering the application's main routine. The present techniques may set its initialization function with the constructor attribute in order to perform this initialization before entering into the main routine. For the other type of locks, the present techniques may intercept initializations, and confirm the call stacks of these initialization invocations. When an initialization has the same call stack as those listed in the deadlock history file, the present techniques may redirect them appropriately, as shown in FIG. 12.

Redirection: During the prevention, the present techniques may intercept every lock acquisition and release, as well as conditional waits. The present techniques may check whether the lock's first word falls within the special range. If so, the present techniques may redirect the operation to the shared lock. Otherwise, it simply performs the operation on the original pthread_mutex_t object. At every lock acquisition and release, the overhead imposed by the present techniques may be limited to a fetching operation and a checking operation.

Handling recursive and irregular locks: The present techniques may also handle recursive and irregular locks. If a lock has been successfully acquired by the current thread, another invocation on the same lock will fail. Although this problem can be fixed easily by setting the PTHREAD_MUTEX_RECURSIVE attribute for all shared locks, this simple solution cannot handle a program with an irregular lock pattern as shown in FIG. 4. For the normal mutex object, there is no problem for a thread to release an already-released lock (L2 in FIG. 4), since the second release on the released lock will be silently turned into a no-operation. However, if a recursive lock is utilized to replace multiple distinct locks, a thread may mistakenly release an already-released lock (L2), e.g., the code (after line 4 of FIG. 4) will not be protected by any lock, which violates the original semantics of the program.

The present techniques may handle this problem by tracking the locking count of every specific lock (with their original address) in the deadlock sets. For every shared lock, each thread maintains a per-thread lock count, and an array of lock counts that track the status of all original lock variables inside the same deadlock set. The actual shared lock will only be acquired at the first acquisition, while subsequent acquisitions only increment the lock count of its corresponding original lock variable. This also helps report some potential problems of original lock uses. If an original lock variable is acquired multiple times, which indicates a double-lock problem in the original program, the present techniques may report this problem. During a release, the present techniques may first confirm whether the local lock count is larger than 1. If true, it decrements the local and per-thread lock counts at the same time, and only invokes the actual release operation when the per-thread lock count is 0. Otherwise, it simply omits this operation and returns 0. This method matches the original semantics.

Prevention may only be enabled when evidence of potential deadlocks is detected with a lock dependency chain. This prevention does not require a deadlock to occur even once.

Performance Concern: Prevention may increase the lock contention rate, thus affecting the performance of applications by merging different locks into a large lock. However, in an embodiment, the contention rate of merged locks may be tracked, and lock merging may be disabled if the rate is higher than a specified percentage. Alternatively, confirmation may be requested from users and prevention may skip a deadlock set based on the input of the users.

Correctness Concern: In rare situations, the present techniques may add potential new deadlocks, or violate atomicity, when critical information is not observed during prior executions. However, the new deadlocks and atomicity violation may not actually occur during executions, since they are both sensitive to timing. Also, upon the end of an execution, the present techniques may adjust the deadlock sets based on new evidence, and enhance its prevention in future executions.

Figure 17:
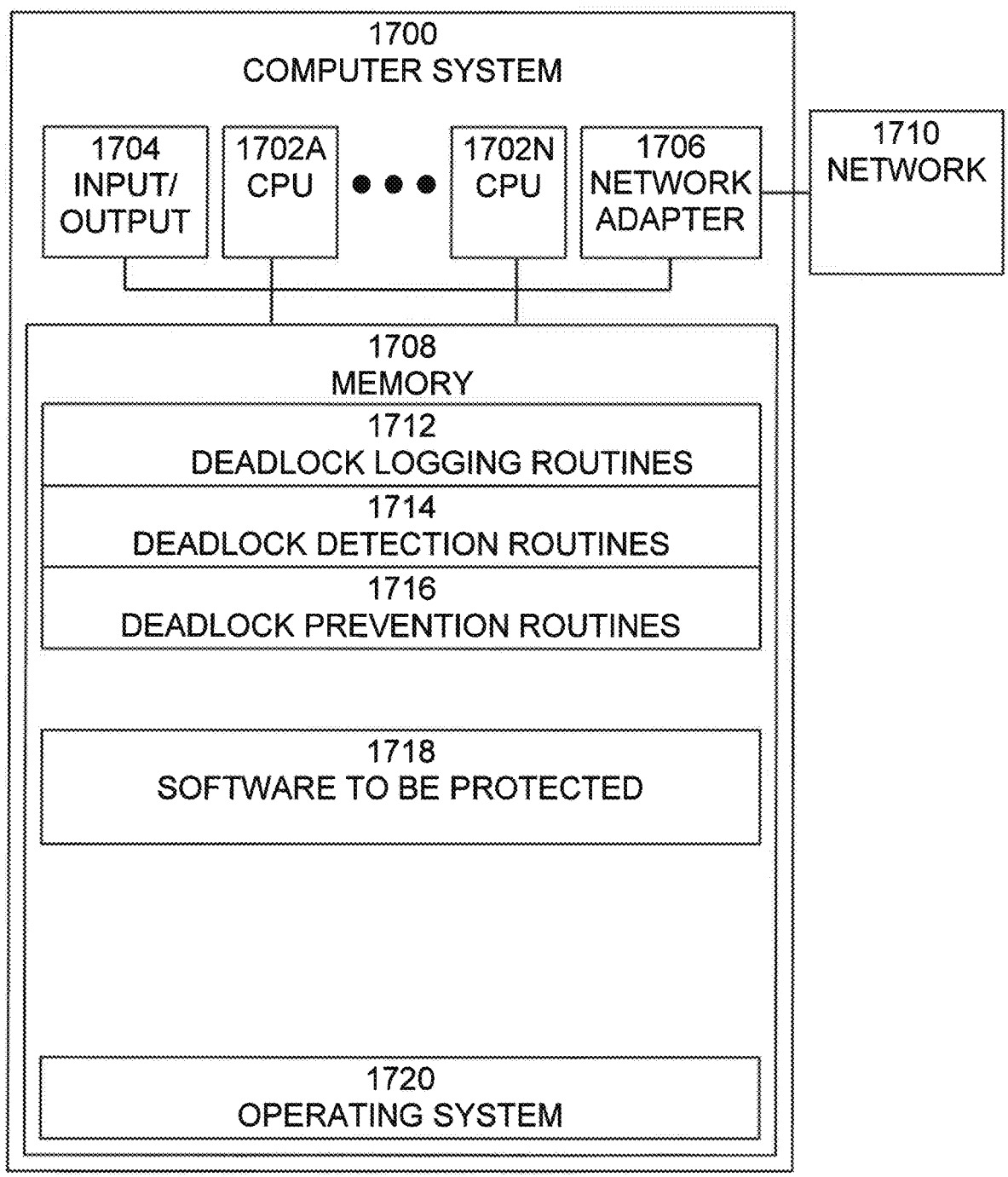
FIG. 17 illustrates an example of a computer system in which embodiments of the present techniques may be implemented.

An exemplary block diagram of a computer system 1700, in which entities and processes involved in the embodiments described herein may be implemented, is shown in FIG. 17. Computer system 1700 may typically be implemented using one or more programmed general-purpose computer systems, such as embedded processors, systems on a chip, personal computers, workstations, server systems, and minicomputers or mainframe computers, or in distributed, networked computing environments. Computer system 1700 may include one or more processors (CPUs) 1702A-1702N, input/output circuitry 1704, network adapter 1706, and memory 1708. CPUs 1702A-1702N execute program instructions in order to carry out the functions of the present communications systems and methods. Typically, CPUs 1702A-1702N are one or more microprocessors, such as an INTEL CORE® processor.

FIG. 17 illustrates an embodiment in which computer system 1700 is implemented as a single multi-processor computer system, in which multiple processors 1702A-1702N share system resources, such as memory 1708, input/output circuitry 1704, and network adapter 1706. However, the present communications systems and methods also include embodiments in which computer system 1700 is implemented as a plurality of networked computer systems, which may be single-processor computer systems, multi-processor computer systems, or a mix thereof.

Input/output circuitry 1704 provides the capability to input data to, or output data from, computer system 1700.

For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 1706 interfaces device 1700 with a network 1710. Network 1710 may be any public or proprietary LAN or WAN, including, but not limited to the Internet.

Memory 1708 stores program instructions that are executed by, and data that are used and processed by, CPU 1702 to perform the functions of computer system 1700. Memory 1708 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 1708 may vary depending upon the function that computer system 1700 is programmed to perform. In the example shown in FIG. 17, exemplary memory contents are shown representing routines and data for embodiments of the processes described above. However, one of skill in the art would recognize that these routines, along with the memory contents related to those routines, may not be included on one system or device, but rather distributed among a plurality of systems or devices, based on well-known engineering considerations. The present communications systems and methods may include any and all such arrangements.

In the example shown in FIG. 17, memory 1708 may include deadlock logging routines 1712, deadlock detection routines 1714, deadlock prevention routines 1716, software to be protected 1718, and operating system 1720. Deadlock logging routines 1712 may include software routines to perform processing to implement logging of information to be used for deadlock detection as described above. Deadlock detection routines 1714 may include software routines to perform processing to implement detection of deadlocks as described above. Deadlock prevention routines 1716 may include software routines to perform processing to implement prevention of deadlocks as described above. Software to be protected 1718 may include software code to be protected from deadlocks as described above. Operating system 1720 may provide overall system functionalities.

As shown in FIG. 17, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it.

Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. Thus, it is impossible for any program to damage the execution of any of the other programs running on the system. However, the programs have no way to exchange any information except through the operating system (or by reading files stored on the file system).

Multi-process computing is similar to multi-tasking computing, as the terms task and process are often used interchangeably, although some operating systems make a distinction between the two. The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the Figures. For example, two blocks shown in succession may, in fact, be executed substantially concurrently, or in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or that carry out combinations of special purpose hardware and computer instructions. Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

From the above description, it can be seen that the present invention provides a system, computer program product, and method for the efficient execution of the described techniques. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A method for improving performance of software code by preventing deadlocks comprising:
executing software code in a computer system comprising at least one processor, memory accessible by the at least one processor, and program instructions and data for the software code stored in the memory, the program instructions executable by the at least one processor to execute the software code;

logging information relating to occurrence of deadlock conditions among threads in the executing software code, wherein the logging is not performed for only one thread executing, single-level locks, call stacks having a first level lock, and call stacks having a same stack offset and a same lock variable address;

detecting occurrence of deadlock conditions in the software code based on the logged information; and modifying the software code or data used by the software code so as to prevent occurrence of at least one detected deadlock condition, comprising redirecting all locks corresponding to each detected deadlock condition to a dedicated lock separately, based on setting the first word of each lock as the memory address of corresponding dedicated lock, and preventing a deadlock from occurring for the at least one detected deadlock condition.

2. The method of claim 1, wherein the logging is performed for nested locks with their call stacks of both lock initialization and lock acquisitions in multiple thread execution.

3. The method of claim 1 wherein the detecting comprises:

periodically checking a current status during execution to determine that a deadlock exists when at least one cycle has occurred and the status is unchanged; and checking the logged information in the end of execution to determine that a potential deadlock exists when at least one cycle is found.

4. The method of claim 1, wherein the modifying comprises at least one of:

merging a plurality of locks into one lock using redirection and updating the plurality of locks to be merged after execution; and intercepting lock initialization and modifying initialization of the lock.

5. A system for improving performance of software code by preventing deadlocks, the system comprising at least one processor, memory accessible by the at least one processor, and program instructions and data stored in the memory, the program instructions executable by the at least one processor to perform:

executing the software code in the computer system;

logging information relating to occurrence of deadlock conditions among threads in the executing software code, wherein the logging is not performed for only one thread executing, single-level locks, call stacks having a first level lock, and call stacks having a same stack offset and a same lock variable address;

detecting occurrence of deadlock conditions in the software code based on the logged information; and modifying the software code or data used by the software code so as to prevent occurrence of at least one detected deadlock condition, comprising redirecting all locks corresponding to each detected deadlock condition to a dedicated lock separately, based on setting the first word of each lock as the memory address of corresponding dedicated lock, and preventing a deadlock from occurring for the at least one detected deadlock condition.

6. The system of claim 5, wherein the logging is performed for nested locks with their call stacks of both lock initialization and lock acquisitions in multiple thread execution.

7. The system of claim 5, wherein the detecting comprises:

periodically checking a current status during execution to determine that a deadlock exists when at least one cycle has occurred and the status is unchanged; and checking the logged information in the end of execution to determine that a potential deadlock exists when at least one cycle is found.

8. The system of claim 5, wherein the modifying comprises at least one of:

merging a plurality of locks into one lock using redirection and updating the plurality of locks to be merged after execution; and intercepting lock initialization and modifying initialization of the lock.

9. A computer program product for improving performance of software code by preventing deadlocks, the computer program product comprising a non-transitory computer readable medium storing program instructions that when executed by at least one processor perform:

executing the software code in the computer system;

logging information relating to occurrence of deadlock conditions among threads in the executing software code, wherein the logging is not performed for only one thread executing, single-level locks, call stacks having a first level lock, and call stacks having a same stack offset and a same lock variable address;

detecting occurrence of deadlock conditions in the software code based on the logged information; and modifying the software code or data used by the software code so as to prevent occurrence of at least one detected deadlock condition, comprising redirecting all locks corresponding to each detected deadlock condition to a dedicated lock separately, based on setting the first word of each lock as the memory address of corresponding dedicated lock, and preventing a deadlock from occurring for the at least one detected deadlock condition.

10. The computer program product of claim 9, wherein the logging is performed for nested locks with their call stacks of both lock initialization and lock acquisitions in multiple thread execution.

11. The computer program product of claim 9, wherein the detecting comprises:

periodically checking a current status during execution to determine that a deadlock exists when at least one cycle has occurred and the status is unchanged; and checking the logged information in the end of execution to determine that a potential deadlock exists when at least one cycle is found.

12. The computer program product of claim 9, wherein the modifying comprises at least one of:

merging a plurality of locks into one lock using redirection and updating the plurality of locks to be merged after execution; and intercepting lock initialization and modifying initialization of the lock.

* * * * *